(12) United States Patent
Musial et al.

(10) Patent No.: US 7,913,916 B2
(45) Date of Patent: Mar. 29, 2011

(54) SMARTCARD AND A METHOD OF OPERATING A SMARTCARD

(75) Inventors: Pawel Musial, Geldrop (NL); Peter Jan Slikkerveer, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 651 days.

(21) Appl. No.: 11/816,290

(22) PCT Filed: Feb. 14, 2006

(86) PCT No.: PCT/IB2006/050473
§ 371 (c)(1),
(2), (4) Date: Aug. 15, 2007

(87) PCT Pub. No.: WO2006/087673
PCT Pub. Date: Aug. 24, 2006

(65) Prior Publication Data
US 2008/0149734 A1    Jun. 26, 2008

(30) Foreign Application Priority Data
Feb. 17, 2005    (EP) .................................. 05101208

(51) Int. Cl.
G06K 19/06    (2006.01)
(52) U.S. Cl. ...................................... 235/492

(58) Field of Classification Search ............... 235/492, 235/380, 441, 476
See application file for complete search history.

(56) References Cited

U.S. PATENT DOCUMENTS

| 5,126,548 | A | * | 6/1992 | Sekiguchi | 235/492 |
| 5,857,079 | A | * | 1/1999 | Claus et al. | 705/33 |
| 6,816,058 | B2 | * | 11/2004 | McGregor et al. | 340/5.26 |
| 7,140,549 | B2 | * | 11/2006 | de Jong | 235/492 |
| 7,464,192 | B2 | * | 12/2008 | Barnett et al. | 710/11 |
| 2002/0082847 | A1 | | 6/2002 | Vandewalle et al. | |
| 2003/0140221 | A1 | | 7/2003 | Garnett | |
| 2004/0056083 | A1 | | 3/2004 | Graf et al. | |
| 2004/0088562 | A1 | * | 5/2004 | Vassilev et al. | 713/200 |
| 2004/0124246 | A1 | | 7/2004 | Allen et al. | |
| 2004/0263431 | A1 | | 12/2004 | Hohmann et al. | |

FOREIGN PATENT DOCUMENTS

| DE | 19631557 A1 | 2/1998 |
| EP | 0779598 A2 | 6/1997 |
| JP | 2001331771 | 11/2001 |

* cited by examiner

Primary Examiner — Seung H Lee

(57) ABSTRACT

A smartcard (200) comprises a processor (202), a read and/or write device interface (213) designed for a communication between the processor (202) and a read and/or write device (208), and a user input and/or output unit (212) designed for initiating a communication between a user and the processor (202) via the read and/or write device interface (213).

14 Claims, 2 Drawing Sheets

SMARTCARD AND A METHOD OF OPERATING A SMARTCARD

FIELD OF THE INVENTION

The invention relates to a smartcard as well as to a method of operating a smartcard.

BACKGROUND OF THE INVENTION

A smartcard or chipcard can be a tiny secure cryptoprocessor embedded within a credit card-sized card or within an even smaller card, like a SIM card for mobile phones. A smartcard usually does not contain a battery, but power is supplied by a card reader/writer, that is to say by a read and/or write device for controlling the functionality of the smartcard by reading data from the smartcard or by writing data into the smartcard.

A smartcard device is commonly used in the areas of finance, security access and transportation. Smartcards usually contain high-security processors that function as a secure storage means of data like cardholder data (for instance name, account numbers, number of collected loyalty points). Access to these data is only possible when the card is inserted into a read/write terminal.

It is a challenging task to enable integration of a user interface functionality directly into smartcards. For instance, a display may be integrated within a smartcard to display information to a user. Or, buttons may be included in the smart card to allow a user to enter data.

Smartcards were consciously designed without a man-machine interface providing user interaction capability. The lack of support for user interaction is reflected both in the hardware design and in the software design (operating system) of known smartcards.

This conscious choice has been driven by the lack of technology for thin, flexible displays and by strict security requirements posed for smartcards. Nowadays, since the technology for thin, flexible displays is available, strict security rules and procedures make the implementation of user interaction difficult. The introduction of API (application programming interface) known from consumer electronics devices and from personal computer devices is difficult, since security rules require that every system component has to be developed under observance of special procedures, for instance with respect to security and reliability. This requires, when developing or changing any chipcard processor component or software component, a lengthy certification procedure followed by a lengthy process of industry acceptance.

In the following, referring to FIG. 1, a smartcard with integrated display functionality according to the prior art will be described.

The smartcard 100 comprises a plastics substrate 101 on which an integrated circuit is formed, which provides the smartcard functionality.

In a security domain or processor 102 (a secure IC processor) of the smartcard 100, in which a high level of security is provided, a card manager unit 103 (which may be a logical unit, a software procedure running when an Application Protocol Data Unit, APDU, is received) is arranged which is adapted to communicate with a plurality of application units 104 each of which contains data and commands needed for servicing different applications. An operating system 105 is provided containing software for operating the smartcard 100. Further, a plurality of driver units 106 are provided, which are each used for driving an associated hardware unit 107.

The smartcard 100 is designed to communicate with a smartcard read and write terminal 108 as a master. The communication between the terminal 108 and the smartcard 100 is performed via the exchange of Application Protocol Data Units (APDU) according to ISO 7816. The card manager unit 103 exchanges APDUs with a particular one of the application units 104 to carry out a corresponding one of the applications.

The internal structure of the smartcard 100 is similar to a standard (personal computer-like) architecture, which can be described, in the well-known layered model. Looking at the hardware units 107, these units may include processors, memories, peripherals and several encryption/decryption co-processors working directly with low-level drivers. The driver units 106 form part of the Operating System Layer (OSL). OSL provides an abstraction of functions in hardware to applications and provides additional functions often reused by applications. The operating system 105 is also responsible for chip initialization during power-up.

On the top of the operating system, provider-specific applications may be run which are shown schematically in FIG. 1 as application units 104. Since smartcards like the smartcard 100 are commonly used with terminals like the smartcard read and write terminal 108, a master-slave like communication behaviour is deployed. This means that the terminal 108 initiates communication with the smartcard 100 sending Application Protocol Data Units (APDU) to the processor 102. The card manager 103 using address field in APDU may recognize to which application unit 104 it should be forwarded. Addressed application, after reception of that information, executes requested action and in return responds with status/data to the terminal 108. This communication scheme requires that for complex applications, both terminal 108 and smartcard 100 have to store actual state of communication.

Apart from the described components and their function, the smartcard 100 comprises extensions to allow a user interface functionality of the smartcard 100.

For this purpose, in a portion of the smartcard 100, which does not relate to the processor 102 (security domain), buttons 112 and a display 113 are provided. In order to allow a user to interact with the smartcard 100 via inputting commands by the buttons 112 and via outputting information on the display 113, there is a connection between the buttons 112/the display 113 and a button/display interface unit 111 arranged on the level of the hardware units 107. Further, a button/display driver unit 110 is provided on the level of the driver units 106 to allow a user to visually perceive data being displayed on the display 113. In the smartcard 100 shown in FIG. 1, a display functionality or user interface functionality is provided by the display 113 and the buttons 112. Furthermore, an extension or adaptation of the operating system 105 is necessary, which is shown schematically as an operating system extension 109 in FIG. 1.

While standard blocks of the smartcard 100 are shown with solid lines, additional blocks, which are necessary for input/output functionality, are marked with dotted lines. It can be seen that the button/display driver unit 110, the button/display interface unit 111, the buttons 112 and the display 113 as well as the operating system extension 109 have been added and the operating system 105 has been extended with functions to provide display functionality API to the applications performed according to the application units 104.

However, the smartcard 100 implementation according to FIG. 1 has some drawbacks.

Firstly, the operating system 105 requires modification in the form of the operating system extension 109. This causes development costs and certification costs. Moreover, due to the modifications interfering in the processor 102 (the secure domain) of the smartcard 100, potential security risks occur.

Secondly, apart from additions to the hardware drivers, an additional mode of use for the smartcard 100 has to be defined which differs from the native master-slave mode. This additional mode can be used when the smartcard 100 is started out-of-terminal (so-called "standalone mode") to respond to a user pressing the buttons 112 and to display information. This affects the architecture of the smartcard 100 system and brings an additional security threat, which requires additional qualification.

Thirdly, the application units 104 need to be modified to incorporate an input/output functionality. This is difficult to achieve for well-known established and accepted standards like EMV ("Europay, Mastercard, VISA", a standard for credit/debit financial card applications) or CEPS ("Common Electronic Purse Specification", a standard for e-Purse Applications) and would require re-standardization.

Fourthly, the smartcard device (chip) requires to have additionally a hardware interface, namely the button/display interface 111, to communicate to the buttons 112/the display 113 and to the button/display driver 110, respectively. Such an interface may not be desired due to security threats.

JP 2001-331771 discloses an IC card with auto-display function, wherein a signal line for a communication between a reader/writer and a microcontroller is used in common as a signal line for transferring data to a display driver from the microcontroller. According to JP 2001-331771, an additional clock line (denoted as CLK2) is provided between display and secure microcontroller, which additional clock line is not led to the outer part. In other words, according to JP 2001-331771, the microcontroller controls the communication with the display. However, this has the disadvantage that security problems may occur when operating the IC card. Additionally, in JP 2001-331771, writing to the display is only possible when the card is in a read/write device.

OBJECT AND SUMMARY OF THE INVENTION

It is an object of the invention to operate a smartcard in a secure manner.

In order to achieve the object defined above, a smartcard and a method of operating a smartcard according to the independent claims are provided.

According to an exemplary embodiment of the invention, a smartcard is provided comprising a processor. The smartcard further comprises a read and/or write device interface designed for a communication between the processor and a read and/or write device, and a user input and/or output unit designed for initiating a communication between a user and the processor via the read and/or write device interface.

Furthermore, according to another exemplary embodiment of the invention, a method of operating a smartcard is provided. The method comprises the steps of operating a processor of the smartcard, enabling a communication between the processor and a read and/or write device via a read and/or write device interface of the smartcard, and initiating, by means of a user input and/or output unit, a communication between a user and the processor via the read and/or write device interface. It should be noted that the aforesaid steps do not necessarily have to be performed in the given order.

The term "smartcard" particularly may denote a contact-type chipcard or a contactless chipcard, which may comprise a secured processor for providing one or more applications.

The term "processor" particularly denotes a control unit or a smartcard managing unit, like for instance a microprocessor or a central processing unit (CPU). Such a processor may be manufactured as a monolithically integrated circuit, for instance produced in semiconductor (particularly in silicon) technology.

The term "read and/or write device" particularly denotes an external (with respect to the smartcard) device for controlling the functionality of the smartcard by reading data from the smartcard and/or by writing data in the smartcard.

The term "user input and/or output unit" particularly denotes a device which may be provided at least partially on the smartcard and which allows a user to interact with the smartcard. Particularly, such a "user input and/or output unit" may allow a user to unidirectionally or bidirectionally transmit data to and/or receive data from the processor, which data may be related to a particular application provided by the smartcard.

An "interface" may particularly provide a connection or access to a particular component of a communication system.

The smartcard according to the invention may be capable of providing an application, and the processor of the smartcard may be designed to be operated to provide the application. The term "application" denotes any functionality or service, which is providable by the smartcard, wherein the processor may provide the computational resources to carry out such an application.

The characteristic features according to the invention particularly have the advantage that a smartcard is provided which, apart from optionally carrying out at least one particular application, provides a user interface (for instance a display and/or a keypad) which is connected to a processor via the same signal path as that used for a connection of the processor to a read and/or write device for reading information from the smartcard and/or for writing information into the smartcard. The communication between a user on the one hand (interactively using the user input and/or output unit as a user interface) and the processor on the other hand may be initiated by the read and/or write device interface. In other words, the communication between the user interface and the processor can be controlled from the user side, instead from the processor side. Consequently, from the point of view of the processor (which may be located in a secure portion of the smartcard), a communication with a read and/or write (master) terminal may be realized in a similar or identical manner as a communication with the user input and/or output (master) unit. Thus, the processor of the smartcard according to the described embodiment of the invention may act like a slave in both the communication channels with the read and/or write terminal and the communication channels with the user input and/or output (master) unit. Thus, this communication keeps the secure portion housing the processor unchanged, thereby providing a high level of security.

In fundamental contrast to known concepts (for instance that according to JP 2001-331771), the smartcard according to the described exemplary embodiment of the invention does not use the processor for controlling the input/output means (for instance keypad, display). Instead, the input/output means themselves actively initiate the communication to the processor, if desired by a user. In other words, the input/output means according to the invention function as a master node, and the processor functions as a slave node in this communication channel. Effectively, the input/output means emulate a terminal or a read and/or write device.

Since the communication between the read and/or write device on the one hand and the smartcard on the other hand is normally (for instance in a bancomat application) initialized by the read and/or write device, the smart card essentially does not recognize the difference between a communication with a read and/or write terminal or a communication with a user interface (for instance like a keypad or a display). This has the advantage that all security features which are (already) provided for the communication between the read and/or write interface on the one hand and the smartcard on the other hand, are also usable for the communication between the smartcard (or rather between the processor of the smartcard) and the user input and/or output unit. Thus, a costly certification of the modified smartcard according to the invention can be dispensed with.

The system according to the invention allows to couple one or more user input and/or output units, like a keypad or a display, to the processor of a smartcard in a simple yet very efficient manner. According to the described architecture, the processor is securely protected against manipulations, so that security-critical applications (for instance credit card, electronic purse) can be reliably performed with this smartcard. Additionally implemented user input and/or output applications can thus be performed without security risks. The invention allows to couple a user input and/or output unit to a processor without weakening of its security mechanisms. Since the provision of a user interface according to the invention does not require modifications in a major part of existing smartcards, the smartcard according to the invention can be constructed with little effort.

According to one aspect of the invention, an external interface of a smartcard, which interface normally provides communication between a smartcard and a terminal, is used simultaneously for the integration of additional components, like a display or a keypad, into a smartcard. A communication between existing parts located in the secure area and novel parts, which may be provided outside of the secure area, may take place via a third party which is part of the smartcard but situated outside of the secure area.

Hence, large parts (for instance a highly secure legacy application) of an existing smartcard can remain unchanged, since a communication protocol for a communication between processor and user interface may be the same as that used for the communication between processor and terminal.

Advantageously, the system according to the invention allows a quick integration of, for instance, display functionality into existing smartcard systems without affecting total system security. Furthermore, backward compatibility to existing systems is possible.

According to an aspect of the invention, a method for integration of user interaction functionality into a smartcard is provided. For this purpose, the external interface of a smartcard, which interface normally allows a data communication between the smartcard and a read/write terminal, is used for the connection of additional components to the smartcard.

According to an aspect of the invention, a display driver unit may take the role of master device in communication, emulating an ordinary ISO 7816 terminal. The display driver according to the invention may communicate with the secure integrated circuit (IC) or processor in a standard way using higher level protocol APDUs (Application Protocol Data Units). Thus, the display driver is seen, by the secure IC, as an ordinary terminal. Thus, the system according to the invention provides a very secure way of connecting the display to a secure integrated circuit, since no modification of the secure integrated circuit hardware or secure integrated circuit (low level) software is required.

In contrast to the system according to the invention, the IC card according to JP 2001-331771 requires an additional clock line from the secure IC to the display driver. Further, a proprietary protocol for communication between the secure IC and the display driver is necessary according to JP 2001-331771. The system according to JP 2001-331771 is based on the assumption that either the terminal or the secure IC is a master in the communication, and the display driver is always a slave (that is to say does not initiate the communication).

The smartcard according to the invention may be implemented according to an architecture in which the communication between the user interaction device and the processor is a master-slave architecture. In the frame of such a communication, the user interaction device may take the role of master (that is to say may initiate a communication by sending a corresponding message to the processor) and the processor may take the role of slave (that is to say may send a response to the user interaction device only in the case of a previously sent message from the user interaction device).

The smartcard according to the invention can be operated in a so-called "standalone mode", that is to say it may be operated also in the absence of a read/write terminal. In this standalone mode, a user may use the user interaction device to communicate with the processor regardless of the presence or absence of a read/write terminal. Moreover, standard, known development tools (SDE) can be used for the development of applications.

It is mentioned that the smartcard according to the invention may include one or more user input and/or output units and may be adapted for a communication between the processor and one or more read and/or write devices.

Referring to the dependent claims, further exemplary embodiments of the invention will be described in the following. These embodiments also apply to the method of operating a smartcard.

The smartcard may be designed so that a communication protocol for a communication between a read and/or write device and the processor equals a communication protocol for a communication between a user and the processor. In other words, the input and/or output means may be arranged in such a manner as to communicate to the processor in essentially the same way as the terminal does. This allows to construct the processor in a very simple manner, since implementing a single communication protocol is sufficient to communicate with both a read and/or write terminal on the one hand and a user via the user input and/or output unit on the other hand.

The smartcard may comprise at least one wired connection element capable of connecting a read and/or write device with the processor, wherein at least a part of the at least one wired connection element may form a connection (exclusively or non-exclusively) of the user input and/or output unit with the processor. According to the described embodiment, the same conductors or wires or contacts may be used for connecting the read and/or write device with the processor, and for connecting the user interface with the processor. By taking this measure, a simple and space-saving construction of the smartcard is possible due to a synergistic use of the wiring. However, additionally or alternatively to the provision of a wired connection element, contactless operation between the secure IC and the smart display controller is possible according to the invention as well.

The smartcard may be designed such that a communication between the user input and/or output unit and the processor may be performed according to ISO 7816. Particular reference is made in this respect to the parts of the ISO 7816 which relate to the definition and use of Application Protocol Data Units (APDUs). The ISO 7816 series or standard defines not only physical shapes of the smartcard and the positions and shapes of its electrical connectors, but also communication protocols and power voltages to be applied to those connectors, a functionality and a format of commands sent to the smartcard and of the response returned by the smartcard. The communication between the read and/or write device on the one hand and the processor on the other hand may be carried out, according to this embodiment, according to the same industrial standard as the communication between the user input and/or output unit on the one hand and the processor on the other hand, which demands for just a simple communication architecture.

Furthermore, the smartcard may be designed for a communication between the user input and/or output unit and the processor by means of a transmission of at least one Application Protocol Data Unit (APDU). An Application Protocol Data Unit may be defined as a communication unit between chipcard and read and/or write device according to the ISO 7816 standard. There are command APDUs, which transmit commands between two entities, and response APDUs, which transmit a response to a command. The APDU communication scheme relates to the well-known OSI model ("Open Systems Interconnection"), and specifically for smartcards the concept of APDUs is described in ISO7816-4 to which explicit reference is made herewith.

The smartcard may be divided into a security portion, in which a security function is provided, and a remaining portion, wherein the security portion includes the processor, and wherein the remaining portion includes the user input and/or output unit. The security portion may be a portion of the smartcard in which components of the smartcard are arranged which contain data which are critical concerning security aspects. The processor, according to the described embodiment, resides in this security portion. However, by locating the input and/or output unit in the remaining portion (having no, or a lower level of, security measures), the processor is provided in a secure area and the input and/or output means are provided in a less secure area. By taking this measure, the overall security is improved, since the access of a user via the user input and/or output unit does not influence the security within the secure portion.

The user input and/or output unit may include at least one of the group consisting of a display, a keypad, a button, an acoustic input and/or output means and a user identification sensor. In general, the user input and/or output unit may include any element which allows a human user to influence the functionality of the smartcard or to be informed in a perceivable manner about such a functionality. Particularly, the user input and/or output unit may include means allowing a user to provide data or commands or messages to the processor, to thus control the functionality of the application(s) running on the smartcard. On the other hand, this includes also providing data or messages or information from the processor to the user to inform the user about a status of an application running on the smartcard.

For instance, a user may identify herself or himself by typing in a password using a keypad or a button. Or, a remaining credit on a paycard may be displayed to a user via a display.

The user input and/or output unit may include any kind of appropriate display means. For instance, a flexible display according to the Philips Flexible Display Systems technology may be implemented with a smartcard. The user interface may then consist of a small display and several buttons, which allow simple menu-based interaction of the user with applications residing on the smartcard.

Further, a keypad may be provided on the smartcard via which a user may type in commands or messages to be sent to the processor. A similar result may be achieved by providing one or more buttons on the smartcard. Particularly, a keypad may be embodied as a plurality of buttons.

It is also possible that an acoustic sensor like a microphone, in particular a MEMS microphone, is provided on the smartcard which allows a user to provide the smartcard with acoustic commands like "display my current credit!" (if necessary or desired in the frame of a voice recognition system). Furthermore, an acoustic output unit, in particular a MEMS speaker, may be provided in the smartcard so that, for instance, a human voice may output requested information to a user in audible manner, like "your current credit is 100€.".

Furthermore, the user input and/or output unit may include a user identification sensor, that is to say a sensor which allows the smartcard to decide whether a user is authorized for accessing the smartcard or not. Such an identification sensor may be a fingerprint sensor, a retina sensor, a DNA sensor, or the like.

The user input and/or output unit may be realized in software and/or in hardware. The user input and/or output functionality according to the invention can thus be realized by a computer program, that is by software, or by using one or more special electronic optimization circuits, that is in hardware, or in hybrid form, that is by means of software components and hardware components.

Generally speaking, the user input and/or output unit may comprise elements allowing a user to perceive data, which are provided by the smartcard. On the other hand, the user input and/or output unit may include elements allowing a user to translate human commands into electronic form.

The smartcard according to the invention may further comprise at least one application unit capable of providing data related to a corresponding application, but incapable of providing the data related to the corresponding application in a format being outputable (for instance displayable) by the user input and/or output unit (for instance a display). The smartcard may further comprise a user interaction application unit (which might also be denoted as an application data conversion unit) which is at least capable of converting data provided by the application unit into a format being outputable by the user input and/or output unit. A communication between the application unit and the user interaction application unit may be mediated by the user input and/or output unit, then acting as a data mirror. This embodiment allows to extend an already existing application unit, which may be located in the security portion but is unable to provide displayable data. The extension is the user interaction application unit (or application data conversion unit), which may fulfil the function of converting data provided by the application unit into a displayable format. Also the application data conversion unit may be provided in the secure portion. In addition to the converting function, the user interaction application unit may optionally fulfil one or more further functions, that is to say it is not restricted to the conversion of data into a displayable format.

The user interaction application unit of the smartcard may be adapted to take the role of master concerning a communication with the application unit. In other words, when the user interaction application unit communicates with the application unit, then the user interaction application unit may control this communication with the slave-like application unit, and may particularly initiate such a communication.

A communication between the application unit and the user interaction application unit may be performed advantageously using the user input and/or output unit, which may be located outside of the secure portion. In other words, the user input and/or output unit may function as a mirror simply forwarding data from the application unit to the application data conversion unit, or vice versa.

The smartcard may be adapted in such a manner that a message transmitted between the application unit and the user interaction application unit is encrypted. By taking this measure, a very secure communication system is obtained, since even when a message is mediated via a non-secure area, the encryption ensures that a high security standard is maintained.

The user input and/or output unit mediating a message transmitted between the application unit and the user interaction application unit may be incapable of decrypting the message. Consequently, a high level of security is maintained, since the mediating means lacks any capability of decoding mediated messages.

The application unit may contain code which is related to a so-called "legacy application". This term particularly denotes an application which has been developed before the display functionality was available. Such applications are considered to be well established and standardized (like EMV or CEPS), but do not provide displaying functionality. Such a legacy application is combined, according to the described embodiment, with a display application, which may also be located in the secure area, like the legacy application. A smart display controller of the user input and/or output unit can be considered as a third party in the communication scheme, which mediates between the legacy application and the display application.

For instance, the display application may send data (as well as a request to forward data to the legacy application) to the smart display controller. The smart display controller may forward the data as requested. The legacy application may respond in a usual way, such as communicating with a terminal. The smart display controller may forward the response to the display application. Then, the display application may request the smart display controller to display the received data.

Both the application unit and the user interaction application unit (application data conversion unit) may be located in the secure portion. According to such an arrangement, data are transmitted from the application unit in the secure domain via the smart display controller located in the non-secure domain to the user interaction application unit located in the secure portion, or vice versa. However, the user input and/or output unit just reflects the data from one of the described units to the other one without processing them, so that no security problems occur. The fact is, the data can be sent in an encrypted manner, and no decryption of the data is carried out by the smart display controller.

The communication between the application unit and the user interaction application unit may include the transmission of at least one Application Protocol Data Unit (APDU). Thus, the communication protocol for this mirror function may be the same as for the communication between the user input and/or output unit and the processor or between the read and/or write device and the processor.

Particularly, the application unit may be a legacy application unit, that is to say an application unit just providing the application without providing sophisticated display functionality.

Exemplary applications of the smartcard according to the invention include the use as a credit card, as a SIM card for a mobile phone, as an authorization card for pay television, as an identification and access control card, as a public transportation ticket, etc.

The smartcard according to the invention may be realized as a contact-type smartcard or as a contactless smartcard. In a contact-type smartcard, an integrated circuit or semiconductor chip including the processor can be recognized by electrically conductive contacts. In a non-contact type smartcard, which may also be denoted as a contactless smartcard, the chip may communicate with the card reader/writer through wireless self-powered induction technology (particularly by exchanging electromagnetic waves, for instance in the high-frequency domain, between the card reader/writer and the smartcard). The technology of contactless smartcards according to the invention can be realized or combined with the technology of RFID (radio frequency identification).

Next, an exemplary embodiment of the method of operating a smartcard will be described. This embodiment also holds for the smartcard according to the invention.

The communication between the user and the processor via the read and/or write device interface may be initiated by means of the user input and/or output unit being arranged in the smartcard. According to this embodiment, the user input and/or output unit is located in the smartcard.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment, but to which the invention is not limited.

DESCRIPTION OF EMBODIMENTS

Figure 1:
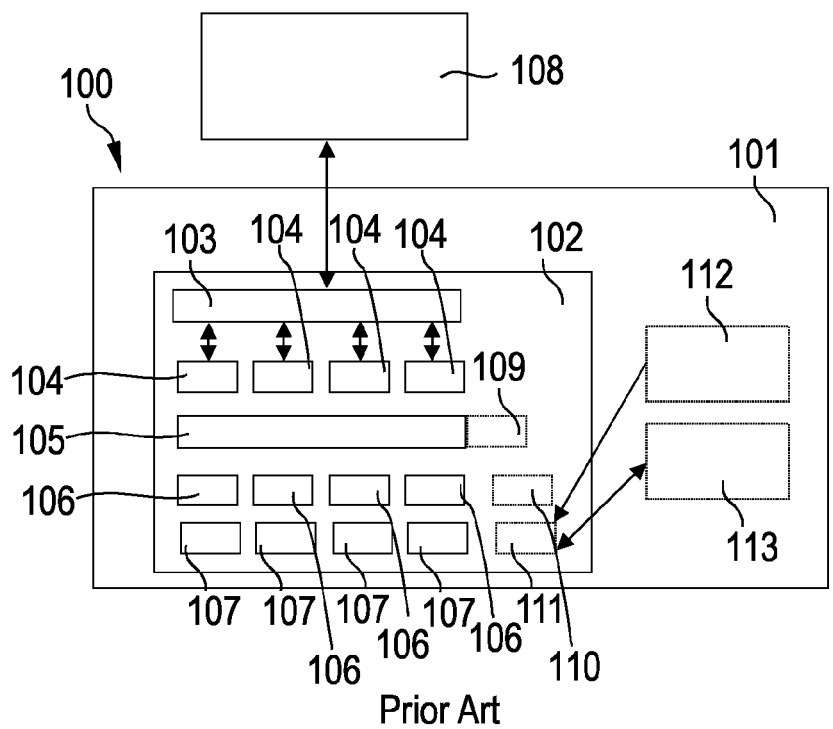
FIG. 1 shows a smartcard according to the prior art.

The illustration in the drawing is schematical. In different drawings, similar or identical elements are provided with the same reference signs.

In the following, referring to FIG. 2, a smartcard 200 according to an exemplary embodiment of the invention will be described in detail. As far as similar components as in FIG. 1 are used, reference is also made to the above description of FIG. 1.

The various components of the smartcard 200 are provided on and/or in a plastic substrate 201. The size of the smartcard 200 may be that of a conventional credit card. The smartcard 200 shown in FIG. 2 is capable of providing a plurality of applications (each of which being related to a particular one of application units 204). The smartcard 200 comprises a microprocessor 202, which is designed to carry out calculations and control functions in the frame of servicing the different applications.

A smartcard read and write terminal 208 (also denoted as a card reader/writer) is provided for reading information stored or generated in the smartcard 200 or for programming, or introducing, externally input data in the smartcard 200. A read and write device interface 213 of the smartcard 200 is designed for a bidirectional communication between the smartcard read and write device 208 and the microprocessor 202.

Further, a user input and output unit 212 (I/O unit) is provided in the smartcard. The user input and output unit 212 can actively initiate a communication between a human user (not shown) and the microprocessor 202 via the smartcard read and write device interface 213. Thus, in the frame of a communication between the user input and output unit 212 on the one hand and the microprocessor 202 on the other hand, the user input and output unit 212 plays the role of master, and the microprocessor 202 plays the role of slave. This allocation of function is atypical, since in the field of electronics it is usually a microcontroller that plays the role of master. However, this allocation of function has the crucial advantage that it improves the security of the data transfer between the different components of the smartcard 200.

The user input and output unit 212 comprises a smart display controller 211 which is realized, according to the described embodiment, in hardware, and which coordinates the communication between the processor 202 on the one hand and display hardware 210 and buttons 209 (as further components of the user input and output unit 212) on the other hand.

A user may use the buttons 209 to type in commands to be conveyed, via the smart display controller 211 and the interface 213, to the processor 203 for further processing thereof in the context of one of the applications assigned to the application units 204. For instance, an application can be a credit/debit financial card application, or the like. Furthermore, data related to an application performed by the smartcard 200 can be transmitted from the processor 202 via the interface 213 and the smart display controller 211 to a display hardware 210 which displays corresponding video and/or audio information for a human user.

Figure 2:
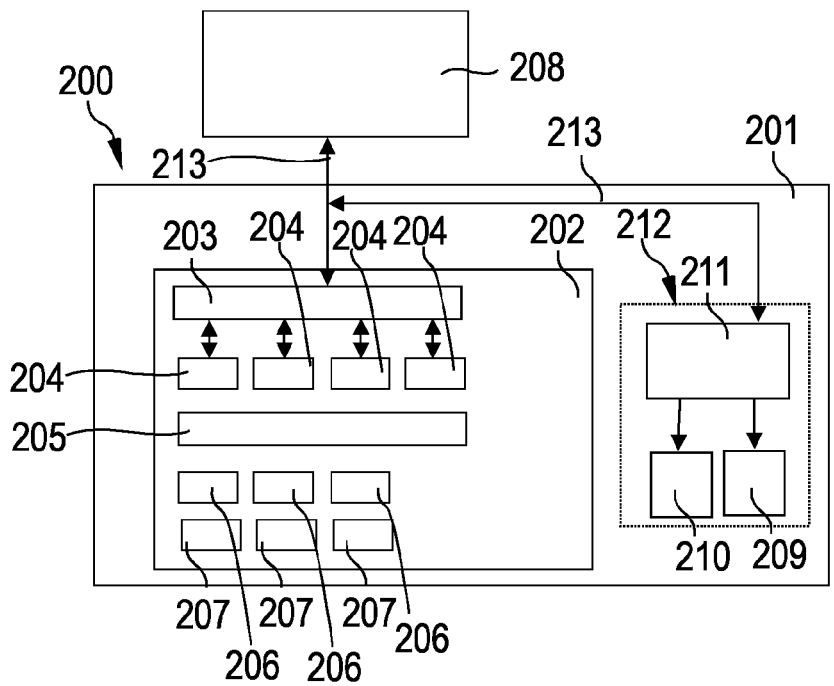
FIG. 2 shows a smartcard according to an exemplary embodiment of the invention.

As can be seen from FIG. 2, the smartcard 200 is divided into a security portion or processor 202 and a—remaining—non-security portion. The microprocessor 202 including the plurality of application units 204 resides in the security portion. Furthermore, an operating system 205 is provided, which may comprise software components for operating the smartcard 200. Moreover, a plurality of driver units 206 and a plurality of hardware units 207 are provided. Each of the hardware units 207 may include components like a sub-processor, a memory, a peripheral, or an encryption/decryption sub-processor.

The communication protocol used for a communication between the smartcard read and write terminal 208 and the microprocessor 202 equals a communication protocol for a communication between a user (not shown) operating the user input and output unit 212 and the microprocessor 202. Both these communication channels are realized by an exchange of Application Protocol Data Units (APDUs) and according to the industry standard ISO 7816.

The user input and output unit 212 includes the display 210 (which can be realized based on the Philips Flexible Display Systems technology) and buttons 209. According to the embodiment shown in FIG. 2, the user input and output unit 212 is realized as a hardware unit.

The smartcard 200 is a high-speed, secure and low-cost device in which the high-security world of smartcard devices and corresponding software remains essentially unchanged (and thus secure and invulnerable to potential attacks), but said smartcard has included a possibility for card application that enables user interaction through existing secure infrastructure. Although the embodiment shown in FIG. 2 focuses on a display 210 and on buttons 209 connected to the smartcard 200 hardware, the system according to the invention can also connect other in-card electronics, like for instance fingerprint readers, or the like.

In the following, the hardware/software connection of the display functionality through existing physical and logical interfaces will be described. FIG. 2 shows an extension of a smartcard system with display functionality. In the smartcard 200, the smartcard processor system (hardware and software) essentially remains unchanged and thus remains secure. In FIG. 2, the I/O functionality is added as a separate user input and output unit 212 next to the processor or secure domain 202 of the smartcard 200.

The smart display controller 211 communicates with smartcard applications (or rather with the microprocessor 202) by using an ISO 7816 interface 213 and by exchanging APDUs with the microprocessor 202. The communication between the user input and output unit 212 and the microprocessor 202 is realized in the same way as the communication with the smartcard read and write terminal 208. Through the interface 213, the smart display controller 211 may inform an application unit 204, by means of a corresponding message, that a button 209 has been pressed by a user and asks the respective application unit for data that should be displayed on the display 210. The security of the system is not affected by the addition of the user input and output unit 212, since the only change resides in applications which need to understand the protocol to drive data on the display 210. No modifications on other system components are required.

The smart display controller 211 can be realized both in hardware and software, both realizations being conceptually equal.

The smartcard 200 shows an embodiment of the smart display controller 211 in hardware. This requires the implementation of the functional block in the display driver and connections from ISO 7816 contacts to that driver. The embodiment of FIG. 2 is very flexible, since the display functionality is only dependent on an application developer. In such a scenario, no additional hardware interface on the microprocessor 202 is needed.

In the following, referring to FIG. 3, a smartcard 300 according to another exemplary embodiment of the invention will be described.

Figure 3:
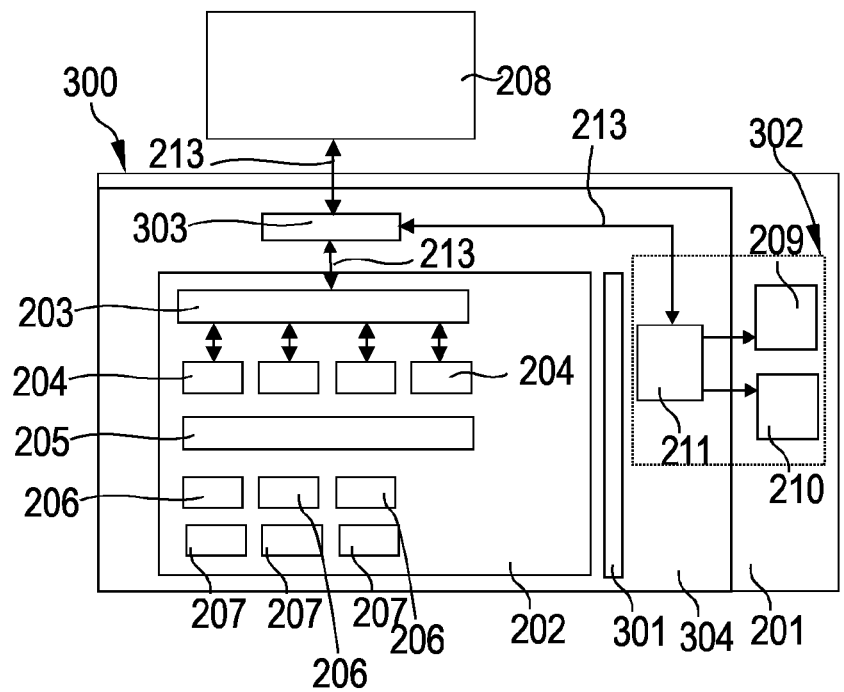
FIG. 3 shows a smartcard according to another exemplary embodiment of the invention.

In the embodiment shown in FIG. 3, the smart display controller 211 is realized in software. Thus, the smart display controller 211 of the user input and output unit 302 resides in a software block 304 of the smartcard 300. The smart display controller 211 further contains the buttons 209 and the display hardware 210. A receiver/transmitter buffer 303 (RX/TX buffer) and a firewall unit 301 also reside in the software block 304.

Realizing the smart display controller 211 in software means that there is a functionality to send and receive APDUs to the card manager 203 of the microprocessor 202 in the form of software by means of function call, for instance through the receiver/transmitter buffer 303. The smart display controller 211 is operated based on software commands as well. It runs in a firewalled region of the card controller, completely separated from the secure domain 202 (similarly to a Philips Mifare emulation on Philips smartcard processors). It drives the display hardware 210 and the buttons 209 through a dedicated interface, for instance through a serial interface. That embodiment of FIG. 3 needs no, or only little, certification.

Figure 4:
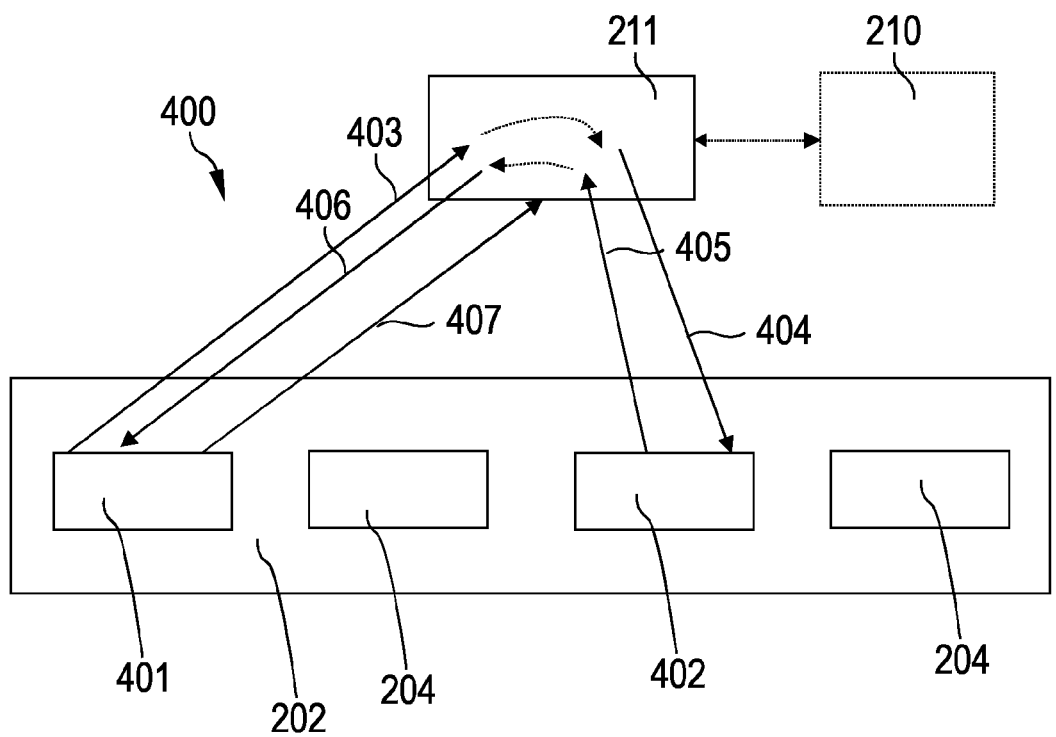
FIG. 4 shows a part of a smartcard according to an exemplary embodiment of the invention illustrating a mirror functionality of a user input and/or output unit.

In the following, referring to FIG. 4, a portion 400 of a smartcard according to still another embodiment of the invention will be described in which a data mirror functionality of the smart display controller is implemented. FIG. 4 illustrates a concept for adding display functionality to legacy applications.

As seen in FIG. 4, the portion 400 comprises a display application unit 401 residing in the security portion or processor 202 and a legacy application unit 402 also residing in the security portion or processor 202. Apart from the display application unit 401 and the legacy application unit 402, further application units 204 are provided in the security portion 202. As will be described in the following, a communication between the display application unit 401 and the legacy application unit 402 is performed via a plurality of transmission channels 403 to 407 and is mediated by the smart display controller 211 acting as a data mirror.

The embodiment shown in FIG. 4 solves the problem of displaying information from well-established and standardized legacy applications (like the one included in the legacy application unit 402), for instance electronic purse (CEPS, Geldkarte, Chipknip). In many cases, such already existing applications are not designed to display information, like an amount stored in the e-purse, on a display.

A straightforward solution of this problem would be to add a display function to the application units. However, that approach would require a major development effort followed by certifications and a long period of time for achieving industrial acceptance.

Another possible solution could be an implementation of terminal emulation functionality in the smart display controller 211. Such an emulated terminal would be able to read required data (for instance an e-purse amount) from the legacy application, format it and display it on the display. However, such a solution would have several disadvantages. For instance, the smart display controller 211 would have to implement the whole terminal functionality with protocols for different application standards (e.g. Geldkarte for Germany, Chipknip for the Netherlands, or CEPS for the new cards). That would result in a complicated and expensive block of hardware and/or software.

Further, the communication with the legacy application unit 402 is often encrypted. This implementation would thus require encryption keys to be stored in the smart display controller 211 during a card completion process (which is cost-intensive and complex). It would also require implementation of cryptology algorithms in the smart display controller 211. Moreover, there would be no customization possibility for the information displayed on the smartcard, since the smart display controller 211 would have to format the display content.

The solution according to FIG. 4 is an implementation of mirror functionality for APDU packages in the smart display controller 211 with a separate display application unit 401. This display application unit 401 is able to retrieve information necessary to format a display content using a standard, known legacy application protocol. Any communication message transmitted between the display application unit 401 and the display application conversion unit 402 is mirrored through the smart display controller 211 as illustrated in FIG. 4. In FIG. 4, only some relevant components of a smartcard are shown as a portion 400. Communication arrows 403 to 407 symbolize the master-slave principle of data exchange of ISO 7816 protocols to simplify the picture.

The application components are encapsulated in the secure domain 202 of a smartcard IC. In the implementation of FIG. 4, there is a display application unit 401 which is a special application designed to retrieve, interpret and display data of one or more given legacy application units 401 through the smart display controller 211.

The communication works as follows: The display application unit 401 sends a request to the smart display controller 211 to mirror (that is to say to forward) communication messages to the target legacy application unit 402. Together with the request, the display application unit 401 sends an encapsulated APDU, which is to be forwarded to the legacy application unit 402, see first transmission arrow 403.

Subsequently, the smart display controller 211 sends (that is to say mirrors) the requested APDU to the legacy application unit 401, see second transmission arrow 404.

The legacy application unit 402 responds in a usual way (just like in a communication with a terminal) by transmitting data/status to the smart display controller 211, see third transmission arrow 405.

The smart display controller 211 again mirrors the response back to the display application unit 401, see fourth transmission arrow 406.

Then, the display application unit 401 can provide display content to the smart display controller 211, see fifth transmission arrow 407, based on data received from the legacy application unit 402.

A significant advantage of that method is security. Since the smart display controller 211 does not need to interpret the mirrored data, the data can be scrambled by means of cryptography keys without leaving the secure domain 202. This means that the display application unit 401 can, in a secure way, get information from the legacy application unit 402 (and vice versa) and extract information that could be displayed on the screen and then send it to the smart display controller 211. So display application unit 401 and legacy application unit 402, which both are part of a secure domain, can communicate via the smart display controller 211, which is outside the secure domain, in a secure manner.

Another benefit of that solution is that a service provider is able to customize the display application unit 401 (that is, for instance, to change the way data are displayed) and stays independent of the card or operating system used. Said solution may even add user identification through, for instance, PIN code to the display application unit 401 to secure access to personal data in the legacy application unit 402. The mirror functionality can be easily implemented in the smart display controller 211.

The system according to the invention may be used in multi-component smartcards, especially in smartcards with a display. The invention allows a quick integration of display functionality into existing smartcard systems without affecting the total system security, and it provides a solution for backward compatibility. The system according to the invention provides, through use of existing standards like ISO 7816, a high degree of simplicity in use for potential customers.

The inventive smartcard 200 may also be used to display data, which is received from the read and/or write device interface 213. In one embodiment said data is directly transferred (without using the processor 202) to the input and/or output unit 212 via the read and/or write device interface 213. In this case the input and/or output unit 212 acts as a slave. However, the processor 202 may be involved in this data display operation as well.

It should be noted that the term "comprising" does not exclude other elements or steps and the use of the indefinite article "a" or "an" does not exclude a plurality. Also elements described in association with different embodiments may be combined.

It should also be noted that reference signs in the claims shall not be construed as limiting the scope of the claims.

The invention claimed is:

1. A smartcard (200), comprising
a processor (202);
a read/write device interface (213) designed for a communication between the processor (202) and at least one device (208) selected from the group consisting of a read device and a write device; and
at least one user unit (212) selected from the group consisting of an input unit and an output unit designed for initiating a communication between a user and the processor (202) via the read/write device interface (213), wherein the at least one device (208) and the at least one user unit (212) are connected through a same single path to the processor.

2. The smartcard (200) according to claim 1, being designed in such a manner that a communication protocol for a communication between the processor (202) and the at least one device (208) selected from the group consisting of a read device and a write device equals a communication protocol for a communication between the at least one user unit (212) selected from the group consisting of an input unit and an output unit and the processor (202).

3. The smartcard (200) according to claim 1, being designed for a communication between the processor (202) and the at least one user unit (212) according to ISO 7816.

4. The smartcard (200) according to claim 1, being designed for a communication between the processor (202) and the at least one user unit (212) by means of a transmission of at least one Application Protocol Data Unit.

5. The smartcard (200) according to claim 1, divided into a security portion, in which a security functionality is provided, and into a remaining portion, wherein the security portion includes the processor (202), and wherein the remaining portion includes at least part of the at least one user unit (212).

6. The smartcard (200) according to claim 1,
comprising an application unit (402) for providing data to the processor (202) which are related to a corresponding application and which application unit (402) not providing the data in a format being outputable by the at least one user unit (212);
and comprising a user interaction application unit (401) for converting the data provided by the application unit (402) into a format being outputable by the at least one user unit (212).

7. The smartcard (200) according to claim 6, wherein the user interaction application unit (401) is adapted to take the role of master concerning a communication with the application unit (402).

8. The smartcard (200) according to claim 6, wherein a communication between the application unit (402) and the user interaction application unit (401) is mediated by the at least one user unit (212).

9. The smartcard (200) according to claim 8, which is adapted in such a manner that a message transmitted between the application unit (402) and the user interaction application unit (401) is encrypted.

10. The smartcard (200) according to claim 8, wherein the at least one user unit (212) mediating a message transmitted between the application unit (402) and the user interaction application unit (401) does not decrypt the message.

11. The smartcard (200) according to claim 5, wherein the application unit (402) and the user interaction application unit (401) are located in the security portion.

12. The smartcard according to claim 6, wherein a communication between the application unit (402) and the user interaction application unit (401) includes the transmission of at least one Application Protocol Data Unit.

13. A method of operating a smartcard (200), wherein the method comprises the steps of:
operating a processor (202) of the smartcard (203);
enabling a communication between the processor (202) and a device (208) via a read/write device interface (213) of the smartcard (200);
initiating, by means of a user input/output-unit (212), a communication between a user and the processor (202) via the read/write device interface (213), wherein the at least one device (208) and the at least one user unit (212) are connected through a same single path to the processor.

14. The method according to claim 13, wherein the communication between the user and the processor (202) via the read/write device interface (213) is initiated by means of the user unit (212) being arranged in the smartcard (200).

* * * * *